United States Patent Office 2,763,692
Patented Sept. 18, 1956

2,763,692

ALPHA-HALOGENATED ALKYLSULFONYL-ACETOPHENONES

Walter A. Gregory, Wilmington, Del., assignor to E. I. du Pont de Nemours and Company, Wilmington, Del., a corporation of Delaware No Drawing. Application May 25, 1955,
Serial No. 511,133

3 Claims. (Cl. 260—592)

This invention relates to substituted sulfonylacetophenones. More particularly, the invention is directed to compounds having the general formula

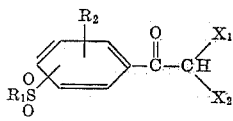

where $R_1$ is a cyclic or acyclic aliphatic group containing up to 12 carbon atoms of the class consisting of unsubstituted and halogen substituted aliphatic groups, $R_2$ is hydrogen, halogen, a lower alkyl or lower alkoxy radical, $X_1$ is chlorine, bromine or iodine, and $X_2$ is hydrogen, chlorine, bromine or iodine.

This application is a continuation-in-part of my copending application Serial No. 337,237, filed February 16, 1953, now abandoned, which in turn is a continuation-in-part of my copending application Serial No. 257,986, filed November 23, 1951, now abandoned.

The substituted sulfonylacetophenones of my invention can be prepared from phenyl sulfides having the formula

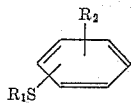

where $R_1$ and $R_2$ have the same significance as in Formula 1, by a variety of methods.

Several of these methods can be diagrammatically represented as follows:

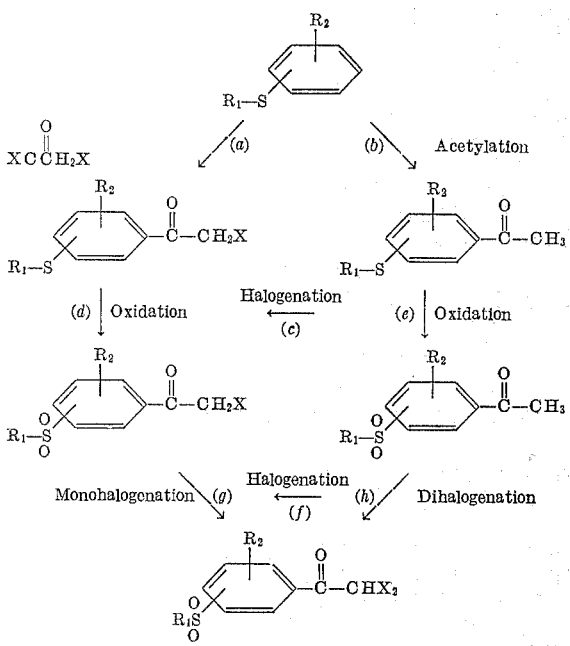

$R_1$ and $R_2$ have the same significance in the above diagram as they do in Formula 1 and X represents chlorine, bromine, and iodine.

The choice of one of the above-indicated routes for synthesizing the compounds of the invention from the substituted phenyl sulfides of Formula 2 is dependent upon a number of factors—not the least of which is the type of substituent $R_1$ and $R_2$ on the phenyl ring.

A preferred method for preparing my novel compounds consists of the following sequence of steps: acetylation (b), oxidation (e), and halogenation (f) or (h) depending on whether the mono- or dihalo product is desired.

In effecting the acetylation of a substituted phenyl sulfide of Formula 2, I prefer to use acetic anhydride as the acetylating agent. Acetyl chloride can also be employed with excellent results. When acetic anhydride or acetyl chloride is used it is preferred to carry out the acetylation in carbon disulfide and in the presence of aluminum chloride.

Acetylation of the phenyl sulfide using acetyl chloride is preferably effected at a temperature of from about zero to 5° C. Higher temperatures may, however, be employed.

Oxidation of the mercapto radical of the mercaptoacetophenone resulting from step (b) or of the alpha-halo-mercaptoacetophenone from steps (a) or (c) to a sulfonyl group can be readily effected in glacial acetic acid using a 30% hydrogen peroxide solution.

Halogenation steps (c), (f), (g) and (h) are preferably carried out in glacial acetic acid. In preparing the dihalo compounds, two moles of halogen are employed for each mole of the aliphatic substituted acetophenone. When the monohalo substituted acetophenone is used as the starting material, only one mole of halogen is used to react with one mole of monohalo compound.

Monohalogenation is carried out at a temperature from 16 to 70° C., preferably between 20 and 30° C., in glacial acetic acid. In most cases, the use of glacial acetic acid as the reaction medium will result in a slurry but this medium is most preferred. Among other solvents which may be used are chloroform and carbon tetrachloride, chloroform being the better solvent. With chloroform or carbon tetrachloride, the halogenation is carried out at a temperature between 0° C. and the boiling point of the solvent. A temperature range of 15°–30° C. is preferred.

Dihalogenation can be carried out at a temperature of from 40 to 118° C., preferably between 50 and 70° C. Glacial acetic acid is the preferred reaction medium, but other media may be employed. Within the temperature limits previously mentioned, most substituted acetophenones are soluble in glacial acetic acid and the halogenation is performed in solution.

The substituted sulfonylacetophenones of the present invention do not have the lacrimatory properties of many of the phenacyl halides of the prior art.

The compounds of my invention are useful as fungicides, particularly against early blight (*Alternaria solani*), a disease common to tomato plants, at concentrations of 0.2% or less. They are useful as bactericides and more particularly as disinfectants. They are also of use in the treatment of seeds and in the synthesis of chemotherapeutic agents.

In order to better understand the invention, reference should be had to the following illustrative examples:

EXAMPLE 1

*Preparation of alpha - bromo - p - methylsulfonylacetophenone*

To a stirred solution of 1014 g. of thioanisole in 3600 cc. of carbon disulfide there is added 2180 g. of aluminum chloride. 843 g. of acetic anhydride is then added slowly to the mixture so as to maintain reflux. The addition of acetic anhydride requires three hours. At the end of the three-hour period the mixture sets to a semisolid green suspension.

The suspension is diluted with 1 liter of carbon disulfide and poured with stirring on 15 liters of ice and water containing 600 cc. of concentrated hydrochloric acid. The carbon disulfide layer is separated and the aqueous solution extracted with chloroform. The carbon disulfide layer and chloroform extract are combined and distilled at 0.35 mm. The fraction boiling from 134–140° C., which is p-methylmercaptoacetophenone, is collected. It has the formula

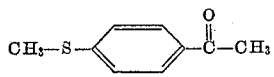

A solution of 1139 g. of p-methylmercaptoacetophenone in 2530 cc. of acetic acid is heated to reflux and 2840 cc. of 30% hydrogen peroxide then added at such a rate that refluxing is maintained without external heating. At the end of the addition, heat is applied to the solution to keep it refluxing. The total reaction time is three hours. The hot solution is then diluted with 2 liters of water, cooled to a temperature of 14° C. and filtered. A solid product is collected, washed well with water, and dried. This snow-white crystalline product is p-methylsulfonylacetophenone, M. P. 127–128.5° C. Its formula is as follows:

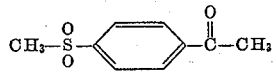

A suspension of 1140 g. of p-methylsulfonylacetophenone in 1940 cc. of glacial acetic acid is stirred at a temperature of about 28° C. as 919.1 g. of bromine is added. After the first few drops of bromine are added, there is an induction period of about twenty minutes before the mixture decolorizes. The bromine is then added over a three-hour period. The temperature of the reaction mixture is maintained between 15 and 30° C. during the bromine addition by external cooling. The mixture is filtered, and a solid product collected and washed first with acetic acid and then with water. The product so obtained is alpha-bromo-p-methylsulfonylacetophenone. It has a melting point of 125–127° C. and is represented by the following formula:

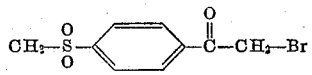

Analysis calculated for $C_9H_9BrO_3S$: C, 39.00, H, 3.27; Br, 28.83. Found: C, 39.22; H, 3.47; Br, 28.85.

Alpha-bromo-p-methylsulfonylacetophenone is useful as a bactericide and as a fungicide. In a standardized tube dilution test, the compound completely inhibits the growth of Salmonella typhimurium at 31 gamma/ml., Streptococcus agalactiae at 62.5 gamma/ml., Pseudomonas aeruginosa at 1000 gamma/ml., Micrococcus pyogenes var. aureus at 250 gamma/ml. and Candida albicans at 31 gamma/ml.

The compound of this example can be used to control early blight on tomato foilage at concentrations of 0.2% or less. A formulation containing 0.2% alpha-bromo-p-methylsulfonylacetophenone gives 95% control (5% disease) of early blight. A concentration of 0.04% gives 93% control (7% disease). To determine the per cent disease on the tomato foliage, lesion counts are made after a suitable period of incubation following exposure of the tomato plant to the early blight fungus. It will be understood that complete control results in zero per cent disease.

EXAMPLE 2

Alpha, alpha-dibromo-p-methylsulfonylacetophenone

Nineteen and eight-tenths grams of p-methylsulfonyl-acetophenone are dissolved into 100 ml. of glacial acetic acid at 40–50° C. Thirty-two grams of bromine is placed in a funnel. While the acetic acid solution is stirred, one or two drops of bromine are added. The temperature of the reaction mixture is slowly raised until decoloration occurs. This happens between about 50 and 60° C. The rest of the bromine is then added dropwise at a fast rate. It reacts instantaneously. When the reaction is completed, it is cooled down to room temperature and the reaction mitxure is poured into 500 ml. of iced water and left overnight on standing. An oil separates from the water and crystallizes in a matter of minutes. The crystalline product is filtered off and throughly washed with water.

After recrystallization, the pure alpha, alpha-dibromo-p-methylsulfonylacetophenone melts at 135.5–136.5°.

This compound completely inhibits in vitro growth of the following microorganisms at the indicated concentrations:

| | Gamma/ml. |
|---|---|
| Salmonella typhimurium | 125 |
| Streptococcus agalactiae | 125 |
| Micrococcus pyogenes var. aureus | 62.5 |
| Pseudomonas aeruginosa | 500 |
| Candida albicans | 62.5 |
| Escherichia coli | 250 |

Alpha, alpha - dibromo - p - methylsulfonylacetophenone is also of value as a fungicide inasmuch as it gives complete control of early blight on tomato foliage at a concentration of 0.2%. At a concentration of 0.04%, 96% control is obtained.

EXAMPLE 3

Alpha-chloro-p-methylsulfonylacetophenone

Thirty-nine and six-tenths grams of p-methylsulfonyl-acetophenone are suspended in 250 ml. of glacial acetic acid. Seven grams of dry chlorine are introduced into the solution which is heated to 70° C. and stirred. Fifteen minutes later heating is discontinued and the reaction mixture is allowed to cool down. Then it is poured into one liter of cold water. The resulting crystalline precipitate is filtered off and recrystallized from benzene, M. P. 128.5–129.5° C. Its structural formula is shown below.

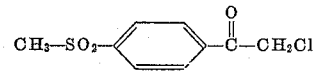

In a standardized tube dilution test, this compound inhibits the following organisms at the concentrations shown:

| | Gramma/ml. |
|---|---|
| Salmonella typhimurium | 6.25 |
| Streptococcus agalactiae | 25 |
| Micrococcus pyogenes var. aureus | 6.25 |
| Pseudomonas aeruginosa | 200 |
| Candida albicans | 25 |
| Escherichia coli | 25 |

The compound substantially controls (17% disease) early blight (Alternaria solani) on tomato foilage at a concentration of 0.2%, and at a concentration of 0.4%, there is 27% disease.

EXAMPLE 4

Alpha, alpha-dichloro-p-methylsulfonylacetophenone

This compound is prepared in accordance with the method described in Example 3 except 14 grams of chlorine is used instead of 7 grams. The compound may also be prepared by the method of Example 3 except 23.3 grams of alpha-chloro-p-methylsulfonylacetophenone is employed instead of the unhalogenated acetophenone and 7 grams of chlorine.

The dichloro compound is useful in controlling early blight when applied to tomato foliage.

EXAMPLE 5

*Alpha-bromo-p-ethylsulfonylacetophenone*

To a mixture consisting of 1050 ml. of carbon disulfide, 195 g. of ethyl phenyl sulfide and 168 g. of acetyl chloride cooled to 2–3° C. there is added slowly over a period of one and three-quarters hours 210 g. of anhydrous aluminum chloride. The temperature of the reaction mixture is kept below 5° C. The mixture is stirred for an additional two hours below 5° C. It is allowed to warm to room temperature over a period of one hour. The mixture is then refluxed for a period of one hour, cooled and poured into 2300 g. of ice and water containing 175 ml. of concentrated hydrochloric acid. The characteristic green reaction mixture turns dark brownish-red.

The carbon disulfide layer is separated from the aqueous portion. The latter is extracted with 250 ml. of carbon disulfide. The combined carbon disulfide portions are dried over sodium sulfate. The carbon disulfide is removed by distillation under reduced pressure and the dark brown oily residue fractionated under reduced pressure. The fraction having a B. P. 149–151° C./0.3 mm., and M. P. 42–43° C. is p-ethylmercaptoacetophenone. It is represented by the following formula:

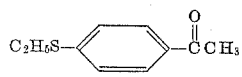

A mixture consisting of 107 g. of p-ethylmercaptoacetophenone, 220 ml. of glacial acetic acid and 270 ml. of 30% hydrogen peroxide is heated on a steam-bath for two hours. Upon cooling the mixture in an ice-bath a voluminous solid separates. The mixture is filtered, and the solid is collected, washed thoroughly with water and air-dried. The original reaction filtrate is diluted with 600 ml. of the washings from above. A small additional amount (10 g.) of solid is obtained. This is added to the main product. The crude product is recrystallized from benzene, M. P. 116–118.5° C. Further recrystallization from 95% ethanol gives white crystals melting at 118–119° C. The product is p-ethylsulfonylacetophenone and can be represented by the following formula:

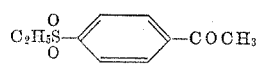

Analysis calculated for $C_{10}H_{12}O_3S$; C, 56.58; H, 5.70; S, 15.10. Found: C, 56.68; H, 5.85; S, 15.20.

A mixture consisting of 97.5 g. of p-ethylsulfonylacetophenone and 500 ml. of glacial acetic acid is cooled to a temperature of 16° C. and treated with a few drops of bromine. An induction period of several minutes elapses before reaction begins and then 74 g. of bromine is added dropwise over a period of two hours. The reaction mixture is sparged with dry nitrogen for a period of one hour and filtered. A solid product is collected, washed thoroughly with water and air-dried. The washings are added to the original reaction filtrate. More solid separates. This is washed with water and air-dried. Both portions of the crude alpha-bromo-p-ethylsulfonylacetophenone are recrystallized from benzene separately until the melting point of the material is 122.5–124.5° C. A small sample recrystallized from 95% ethanol melts 123.5–125° C. The formula for alpha-bromo-p-ethylsulfonylacetophenone is as follows:

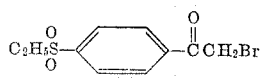

Analysis calculated for $C_{10}H_{11}O_3SBr$: C, 41.25; H, 3.81; S, 11.01. Found: C, 41.22; H, 3.90; S, 11.02.

This compound gives complete control 0% disease) of early blight on tomato foliage at a concentration of 0.2%. At a concentration of 0.04%, there is only 3% disease.

EXAMPLE 6

*Alpha-bromo-p-n-propylsulfonylacetophenone*

A mixture consisting of 750 ml. of carbon disulfide, 191 g. of n-propyl phenyl sulfide and 332 g. of anhydrous aluminum chloride is treated with 127.5 g. of acetic anhydride dropwise over a period of two and one-half hours. The dark green reaction mixture is poured into a mixture of 2500 g. of ice water and 100 ml. of concentrated hydrochloric acid. The carbon disulfide layer is removed and the aqueous portion is extracted twice with 100 ml. of carbon disulfide. The combined carbon disulfide portions are dried over sodium sulfate.

The carbon disulfide is distilled off under reduced pressure, and the red oily residue is fractionated under reduced pressure. The material boiling at 138–140°/0.5 mm. (M. P. 38–39° C.) is predominantly p-n-propylmercaptoacetophenone. A small sample recrystallized from hexane melts 38.5–39° C. p-n-Propylmercaptoacetophenone has the following structure:

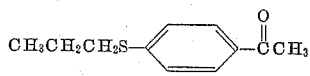

Analysis calculated for $C_{11}H_{14}OS$: C, 68.00; H, 7.26; S, 16.50. Found: C, 68.02; H, 7.23; S, 16.68.

A mixture of 150 g. of n-propylmercaptoacetophenone, 300 ml. of glacial acetic acid and 365 ml. of 30% hydrogen peroxide is heated on a steam bath for a period of two hours, then cooled and filtered. A solid product is collected, washed twice with 300 ml. of water and air-dried, M. P. 88–90° C. The water washings are added to the original reaction filtrate, and an additional 58.5 g., M. P. 87–90° C., of solid is obtained. Both batches are recrystallized separately from a 1:1 mixture of benzene and hexane. Further recrystallization from 1:1 benzene-hexane gave material melting at 90–91° C. This material is p-n-propylsulfonylacetophenone and has the structural formula:

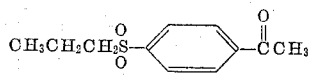

A mixture consisting of 125 g. of p-n-propylsulfonylacetophenone and 380 ml. of glacial acetic acid is treated with a few drops of bromine at a temperature of 16° C. After a delay of about forty-five minutes, the reaction begins and 88 g. of bromine is added dropwise over a period of one and one-half hours. The mixture is sparged with dry nitrogen for a period of one hour and filtered. The solid product is collected, washed twice with 1 liter of water, filtered and air-dried, M. P. 83–94° C. The water washings are added to the original reaction filtrate. Both batches of solid product are recrystallized separately from 95% ethanol and a 1:1 mixture of hexane-benzene to give material of M. P. 91.5–95.5° C. The melting point of the product, alpha-bromo-p-n-propylsulfonylacetophenone, is raised by several recrystallizations from carbon tetrachloride and acetonitrile to 96.5–97.5° C. The bromide thus obtained has the formula:

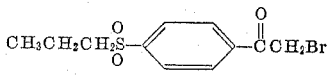

Analysis calculated for $C_{11}H_{13}O_3SBr$: C, 43.29; H, 4.29; S, 10.50. Found: C, 43.05; H, 4.42; S, 10.47.

The compound gives 98% control of early blight on tomato foliage at a concentration of 0.2%. At a concentration of 0.04%, there is 5% disease (95% control).

EXAMPLE 7

*Alpha-bromo-p-isopropylsulfonylacetophenone*

A mixture consisting of 182 g. of isopropyl phenyl sulfide and 900 ml. of carbon disulfide is cooled to a temperature of 2–3° C. and 144 g. of acetyl chloride is then added. 180 g. of anhydrous aluminum chloride is added to the above described reaction mixture over a period of one and one-half hours. During this period the temperature of the mixture is kept below 5° C. The reaction color becomes a characteristic bluish-purple. The reaction mixture is stirred for a period of three hours at a temperature of 0° C. It is then allowed to come to room temperature, which requires about an hour. It is then poured into a mixture consisting of 1800 g. of ice water and 160 ml. of concentrated hydrochloric acid.

The carbon disulfide layer is removed and the aqueous portion extracted twice with 200 ml. of carbon disulfide. The combined $CS_2$ portions are dried and distilled under reduced pressure to remove the carbon disulfide. The dark brown oily residue is fractionated under reduced pressure to yield p-isopropylmercaptoacetophenone, B. P. 121–123°/0.3 mm., $n_D^{25}=1.5807$. The structural formula of p-isopropylmercaptoacetophenone is:

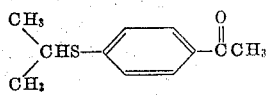

Analysis calculated for $C_{11}H_{14}OS$: C, 68.00; H, 7.26; S, 16.50. Found: C, 67.96; H, 7.24; S, 16.75.

A mixture consisting of 117 g. of isopropylmercaptoacetophenone, 225 ml. of glacial acetic acid and 275 ml. of 30% hydrogen peroxide is heated on a steam bath for a period of two hours. The reaction mixture is cooled and diluted with 1500 ml. of water. The product consisting essentially of p-isopropylsulfonylacetophenone is collected by filtration, washed with 1 liter of water and dried, M. P. 88.5–89.5° C. The product has the following structural formula:

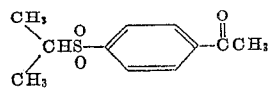

Analysis calculated for $C_{11}H_{14}O_3S$: C, 58.38; H, 6.24; S, 14.17. Found: C, 58.07; H, 6.42; S, 14.18.

A mixture consisting of 98 g. of p-isopropylsulfonylacetophenone and 240 ml. of glacial acetic acid is cooled to a temperature of 16° C. and treated with a few drops of bromine. An induction period of about one and one-quarter hours elapses before the reaction begins. Sixty-nine grams of bromine is added dropwise over a period of one hour. The mixture is stirred for a period of one hour and then sparged with dry nitrogen for a period of one hour. Solid product separates. It is collected by filtration and washed twice with 500 ml. of water and dried. The dried product thus obtained is alpha-bromo-p-isopropylsulfonlyacetophenone. It melts at 83.5–84.5.

The water washings are added to the original reaction filtrate and another portion of solid product, M. P. 73–81.5° C., is collected and washed twice with 500 ml. of water. The second portion of product is recrystallized from methanol to give material melting at M. P. 83.5–85° C. A small batch of the product recrystallized twice from a 1:1 mixture of hexane-benzene melts 83.5–84.5° C. The formula of the product, alpha-bromo-p-isopropylsulfonylacetophenone, is shown below:

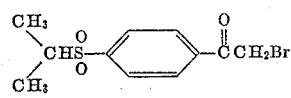

Analysis calculated for $C_{11}H_{13}O_3SBr$: C, 43.29; H, 4.29; S, 10.50. Found: C, 43.63; H, 4.56; S, 10.45.

Alpha-bromo-p-isopropylsulfonylacetophenone gives complete control (0% disease) of early blight (*Alternaria solani*) on tomato foliage at a concentration of 0.2% and at a concentration of 0.04%, there is 4% disease.

*Example 8*

Alpha, alpha-dibromo-p-isopropylsulfonylacetophenone

Thirty and one-half grams of alpha-bromo-p-isopropylsulfonylacetophenone is dissolved into 100 ml. of glacial acetic acid at 40–50° C. Sixteen grams of bromine is placed in a dropping funnel. While the acetic acid solution is stirred, one or two drops of bromine are added. The temperature is slowly raised until decoloration occurs. This usually happens between 50 and 60° C. The rest of the bromine is then added dropwise. When the reaction is completed, it is cooled down and the mixture poured into 500 ml. of iced water. An oil separates which crystallizes almost immediately. The crystals are filtered off and washed with water. After recrystallization from ethanol, they melt at 123–125° C.

In a standardized tube dilution test, this compound inhibits organisms *Salmonella typhimurium* and *Escherichia Coli* at a concentration of 500 gamma/ml., and organism *Candida albicans* at a concentration of 125 gamma/ml.

The compound of this example controls early blight on tomato foliage at a concentration of 0.2% (6% disease) and at a concentration of 0.04%, there is 13% disease.

*Example 9*

Alpha-bromo-p-n-butylsulfonylacetophenone

A mixture consisting of 206 g. of n-butyl phenyl sulfide, 332 g. of anhydrous aluminum chloride and 600 ml. of carbon disulfide is treated with 127.5 g. of acetic anhydride at such a rate that gentle refluxing is maintained. The reaction mixture is stirred for an additional period of two hours and then poured into a mixture of 2500 g. of ice water and 100 ml. of concentrated hydrochloric acid. The carbon disulfide is separated from the aqueous portion. The aqueous portion is extracted twice with 100 ml. of carbon disulfide. The combined carbon disulfide extracts are dried and distilled under reduced pressure to remove the carbon disulfide. The resulting oily residue is fractionated under reduced pressure to yield p-n-butylmercaptoacetophenone, B. P. 128–131°/0.3 mm., M. P. 24.5–25° C., $n_D^{25}=1.4780$. Its formula is shown below:

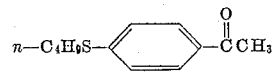

Analysis calculated for $C_{12}H_{16}OS$: C, 69.19; H, 7.74; S, 15.39. Found: C, 69.08; H, 7.70; S, 15.26.

A mixture consisting of 187 g. of p-n-butylmercaptoacetophenone, 340 ml. of glacial acetic acid and 400 ml. of 30% hydrogen peroxide is heated on a steam bath for a period of two hours. The mixture is then cooled in an ice-bath and filtered. The solid product is collected, washed twice with 500 ml. of water and dried. This product is p-n-butylsulfonylacetophenone, M. P. 49.5–50° C.

The water washings are added to the original reaction filtrate and another batch, M. P. 45–47.5° C., of product is obtained. This is also washed with water, dried, and recrystallized from 2:1 hexane-benzene to give a product melting 48.5° C. A small portion of product is further purified by recrystallizations from 2:1 hexane-benzene to give material melting at 49.5–50° C. The formula of the p-n-butylsulfonylacetophenone obtained in this step is:

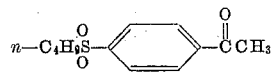

Analysis calculated for $C_{12}H_{16}O_3S$: C, 59.97; H, 6.71; S, 13.34. Found: C,60.11; H, 6.88; S, 13.32.

A mixture consisting of 149 g. of p-n-butylsulfonylacetophenone and 350 ml. of glacial acetic acid is cooled to a temperature of 16° C. and treated with a few drops of bromine. About forty-five minutes elapses before the reaction begins. One hundred grams of bromine is added dropwise over a period of two and one-half hours. The clear reaction mixture is sparged with dry nitrogen for a period of two hours and a small amount of desired product separates. This is collected by filtration, washed with water and dried. Its melting range is 71–72.5° C.

The original reaction filtrate is treated with the water washings from above and a second batch of product, M. P. 64–69° C., is obtained. This latter batch is recrystallized from a 4:3 mixture of hexane and benzene to give alpha-bromo-p-n-butylsulfonylacetophenone melting at 70–71.5° C. The original batch recrystallized from 1:1 hexane-benzene had a melting point of 72–73° C. The product of this reaction, alpha-bromo-p-n-butylsulfonylacetophenone, has the following structural formula:

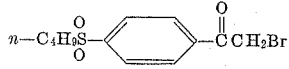

Analysis calculated for C₁₂H₁₅O₃SBr: C, 45.15; H, 4.74; S, 10.04. Found: C, 45.14; H, 4.80; S, 9.95.

This compound gives complete control (0% disease) of early blight on tomato foliage at a concentration of 0.2%, and at a concentration of 0.016%, there is only 12% disease.

EXAMPLE 10

*Alpha-bromo-p-n-amylsulfonylacetophenone*

A mixture consisting of 214.5 g. of n-amyl phenyl sulfide, 330 g. of anhydrous aluminum chloride and 600 ml. of carbon disulfide is treated with 125.5 g. of acetic anhydride over a period of two hours. The mixture is gently refluxed throughout this period. The mixture is stirred for two hours at room temperature. It is then poured into 2400 g. of ice water and 100 ml. of concentrated hydrochloric acid.

The carbon disulfide layer is separated from the aqueous portion. The aqueous portion is extracted twice with 250 ml. of carbon disulfide. The combined dried carbon disulfide portions are distilled under reduced pressure. The product, p-n-amylmercaptoacetophenone, boils at 152–154/1.25 mm. and melts after recrystallization from hexane at 46.5–47.5° C. It can be graphically represented as follows:

Analysis calculated for C₁₃H₁₈OS: C, 70.22; H, 8.16; S, 14.42. Found: C, 70.29; H, 8.25; S, 14.38.

A mixture consisting of 133 g. of p-n-amylmercaptoacetophenone, 225 ml. of glacial acetic acid and 265 ml. of 30% hydrogen peroxide is heated on a steam bath for a period of one hour, then cooled, and filtered. The solid product thus obtained is collected, washed with water and dried, M. P. 59.5–62° C. The water washings are added to the original reaction filtrate and another batch of the desired p-n-amylsulfonylacetophenone, M. P. 57–59.5° C., is obtained. The product is further purified by recrystallization from 4:1 hexane-benzene, M. P. 61–62.5° C. Repeated recrystallizations from 4:1 hexane-benzene raised the melting point of the product to 63.5–64.5° C. The product, p-n-amylsulfonylacetophenone, has the structural formula:

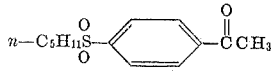

Analysis calculated for C₁₃H₁₈O₃S: C, 61.39; H, 7.13; S, 12.61. Found: C, 61.38; H, 7.17; S, 12.69.

A mixture consisting of 118 g. of p-n-amylsulfonylacetophenone and 260 ml. of glacial acetic acid is cooled to a temperature of 16° C. and treated with a few drops of bromine. About fifteen minutes elapses before a reaction begins. Seventy-four grams of bromine is added dropwise over a period of one hour and fifty minutes. The reaction mixture is stirred for another hour and then filtered. A solid consisting essentially of alpha-bromo-p-n-amylsulfonylacetophenone is collected, washed with water and dried, M. P. 84–86.5° C. The water washings are added to the original reaction filtrate and an additional portion of product, M. P. 82–84.5° C., is obtained. Both portions are recrystallized separately from 2:1 hexane-benzene to give material melting at 85–86° C. The melting point of the product can be raised from 2:1 hexane-benzene to 86.5–87.5° C. by further recrystallizations. The product has the structural formula:

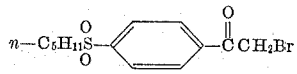

Analysis calculated for C₁₃H₁₇O₃SBr: C, 46.85; H, 5.14; S, 9.62. Found: C, 46.92; H, 5.25; S, 9.70.

Alpha-bromo-p-n-amylsulfonylacetophenone controls early blight on tomato foliage at a concentration of 0.2% (3% disease). At a concentration of 0.04%, the per cent control is 93%.

EXAMPLE 11

*Alpha-bromo-p-dodecyl-sulfonylacetophenone*

A mixture consisting of 180 g. of dodecyl phenyl sulfide, 174 g. of anhydrous aluminum chloride and 320 ml. of carbon disulfide is treated dropwise over a period of one hour and forty minutes with 66 g. of acetic anhydride. The mixture is refluxed for an additional period of twenty minutes and then stirred at room temperature for two hours. The reaction mixture is poured in a solution consisting of 1200 g. of ice water and 50 ml. of concentrated hydrochloric acid. The carbon disulfide layer is collected and the aqueous portion extracted twice with 500 ml. of carbon disulfide. The combined carbon disulfide portions are allowed to evaporate and the crystalline residue consisting essentially of p-dodecylmercaptoacetophenone is recrystallized from 500 ml. of hexane, M. P. 68–69.5° C. Its structural formula is:

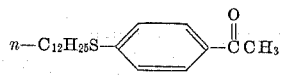

Analysis calculated for C₂₀H₃₂OS: C, 74.94; H, 10.06; S, 10.00. Found: C, 74.62; H, 10.06; S, 10.09.

A mixture consisting of 152 g. of p-dodecylmercaptoacetophenone, 170 ml. of glacial acetic acid and 200 ml. of 30% hydrogen peroxide is heated on a steam bath for a period of one hour, cooled in an ice-bath and filtered. The resulting solid product is washed twice with 500 ml. of water and dried. After the crude p-dodecylsulfonylacetophenone, M. P. 87.5–89° C., it recrystallized from 1200 ml. of hexane it has a melting point of 89–90° C. The formula for p-dodecylsulfonylacetophenone is shown below:

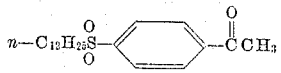

Analysis calculated for C₂₀H₃₂SO₃: C, 68.14; H, 9.15; S, 9.09. Found: C, 68.07; H, 9.17; S, 9.10.

A mixture consisting of 145 g. of p-dodecylsulfonylacetophenone and 300 ml. of glacial acetic acid is treated with a few drops of bromine. An induction period of several hours passes before reaction begins. Then 65.6 g. of bromine is added dropwise over a period of one hour. The reaction mixture becomes a thick slurry as the bromine is added and it is necessary to continue to add glacial acetic acid to facilitate stirring. A total of 1200 ml. of glacial acetic acid is used.

The desired alpha-bromo-p-dodecylsulfonylacetophenone is collected by filtration, washed twice with 1 liter of water and dried, M. P. 95–97.5° C. A small amount of very impure product is obtained by diluting the original reaction filtrate with water. The dried product is recrystallized from 3300 ml. of 10:1 hexane-benzene to give material which melts at 98.5–99.5° C. A portion of the product twice recrystallized from 10:1 hexane-benzene gives a product having a M. P. 99–100° C. The alpha - bromo - p - dodecylsulfonylacetophenone thus prepared can be represented by the following formula:

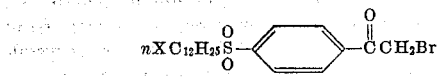

Analysis calculated for $C_{20}H_{31}O_3SBr$: S, 7.43. Found: S, 7.22.

This compound gives about 70% control of early blight on tomato foliage at a concentration of 0.2%.

EXAMPLE 12

*Alpha-bromo-p-cyclohexylsulfonylacetophenone*

A mixture consisting of 223 g. of cyclohexyl phenyl sulfide and 870 ml. of carbon disulfide is cooled to a temperature of 2–3° C. One hundred and forty grams of acetyl chloride is added in one portion. Over a period of one hour and ten minutes 175 g. of anhydrous aluminum chloride is added in small portions while the temperature of the reaction mixture is kept below 5° C. The mixture is stirred for a period of three hours at a temperature of 0° C. and for a period of one hour while the mixture comes to room temperature. The reaction mixture is then poured into a solution consisting of 2000 g. of ice water and 150 ml. of concentrated hydrochloric acid.

The carbon disulfide layer is collected and the aqueous layer extracted once with 300 ml. of carbon disulfide. The combined, dried carbon disulfide portions are distilled under reduced pressure to remove the carbon disulfide and the residue fractionated. The fraction boiling at 156–158° C./0.6 mm., M. P. 63.5–68.5° C. is predominantly p-cyclohexylmercaptoacetophenone. When this product has been crystallized from hexane it melts at 67.5–68° C. p-cyclohexylmercaptacetophenone has the following structural formula:

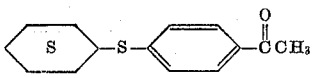

Analysis calculated for $C_{14}H_{11}OS$: C, 71.75; H, 7.74; S, 13.68. Found: C, 71.74; H, 7.82; S, 13.73.

A mixture consisting of 164 g. of p-cyclohexylmercaptoacetophenone, 260 ml. of glacial acetic acid and 325 ml. of 30% hydrogen peroxide is heated on a steam bath for a period of two hours, cooled, and filtered. The solid product is collected, washed twice with 750 ml. of water and dried, M. P. 90–93° C. The water washings are added to the original reaction filtrate and another batch of product, M. P. 81–87° C., is obtained. The crude product comprising p-cyclohexylsulfonylacetophenone is recrystallized from 2400 ml. of 5:1 hexane-benzene for purification purposes. The purified material has a M. P. 92–94° C. Further recrystallizations of the product from 5:1 hexane-benzene raises its melting point to 95–96.5° C. The product thus obtained, namely, p-cyclohexylsulfonylacetophenone, has the formula:

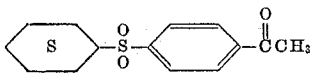

Analysis calculated for $C_{14}H_{18}O_3S$: C, 63.13; H, 6.81; S, 12.04. Found: C, 63.12; H, 6.88; S, 11.97.

A mixture consisting of 115 g. of p-cyclohexylsulfonylacetophenone and 500 ml. of glacial acetic acid is cooled to a temperature of 16° C. and treated with a few drops of bromine. Approximately thirty minutes elapses before the reaction begins. Bromine (68.8 g.) is added dropwise over a period of one hour. The reaction mixture is sparged with nitrogen for a period of one hour and filtered. The solid which is collected is washed twice with 1 liter of water and dried. The dried material, M. P. 100–101.5° C., is the desired bromide.

The water washings are added to the original reaction filtrate and another portion of product, M. P. 92–95° C., is obtained. Both portions of alpha-bromo-p-cyclohexyl-sulfonylacetophenone are recrystallized from a 1:1 mixture of hexane and benzene. A small batch is recrystallized further from 95% ethanol to give substantially pure alpha-bromo-p-cyclohexylsulfonylacetophenone melting at 102.5–103.5° C. The product thus obtained can be represented by the following formula:

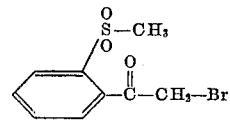

Analysis calculated for $C_{14}H_{17}O_3SBr$: C, 48.70; H, 4.96; S, 9.29. Found: C, 48.82; H, 5.12; S, 9.29.

This compound gives substantially complete control (1% disease of early blight (*Alternaria solani*) on tomato foliage at a concentration of 0.2%. At a concentration of 0.04%, there is only 6% disease.

EXAMPLE 13

*Alpha-bromo-o-methylsulfonylacetophenone* o-Methylmercaptoacetophenone prepared according to the procedure of McClelland and D'Silva, J. Chem. Soc. 1932, 227 is used in this preparation. In brief, their method involves condensing o-methylmercaptobenzoyl chloride with sodioacetoacetic ester and heating the product with alcoholic sulfuric acid.

A solution of 500 g. of o-methylmercaptoacetophenone, M. P. 45–46° C., in 1200 cc. of acetic acid is heated to reflux and 1250 cc. of 30% hydrogen peroxide is added at such a rate that refluxing is maintained without heating. At the end of the addition, heat is applied to the reaction vessel to keep the solution refluxing. The total reaction time required is about three hours. The hot solution is then diluted with one liter of water and cooled to a temperature of 15° C. and filtered. A solid product is collected and washed well with water. This product is o-methylsulfonylacetophenone and has the following structural formula:

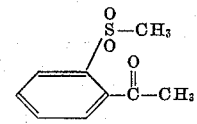

A suspension of 500 g. of o-methylsulfonylacetophenone in 900 cc. of glacial acetic acid is stirred at room temperature as 403 g. of bromine is added. An initial induction period of about an hour is required after the first drops of bromine are added to start the reaction. The bromine is added over a two-hour period. The temperature of the reaction mixture is maintained between 15 and 30° C. during the bromine addition by means of external cooling. A product crystallizes from the solution upon being cooled in an ice bath. A further quantity of the product can be obtained from the filtrate by diluting with water. The product is alpha-bromo-o-methylsulfonylacetophenone and has the following structural formula:

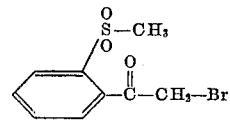

This compound is useful in controlling early blight when applied to tomato foliage.

EXAMPLE 14

*Alpha, alpha-dibromo-o-methylsulfonylacetophenone*

Twenty-seven and seven-tenth grams of alpha-bromo-o-methylsulfonylacetophenone are dissolved in glacial acetic acid between 70–95° C. Sixteen grams of bromine are added dropwise with good stirring. When the addition is completed, heating is continued for about an hour. Then the reaction mixture is cooled to room temperature and poured into one liter of cold water. The dibromo compound comes out of solution and is isolated. Its formula is as follows:

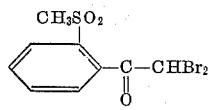

Alpha, alpha-dibromo-o-methylsulfonylacetophenone is useful in controlling early blight when applied to tomato foliage.

EXAMPLE 15

*Alpha-bromo-3-methyl-4-methylsulfonylacetophenone*

A solution of 1864 g. of o-thiocresol in 4 liters of water containing 600 g. of sodium hydroxide is stirred as 1892 g. of dimethyl sulfate is added to the solution. The temperature of the reaction mixture is maintained below 50° C. during the addition of dimethyl sulfate. At the end of the addition, the solution is kept basic by adding portions of 10% aqueous sodium hydroxide as necessary. The resulting product is separated from the aqueous layer. The aqueous layer is extracted with benzene. The product is distilled under reduced pressure. The distilled product is methyl o-tolyl sulfide. It has the following structural formula:

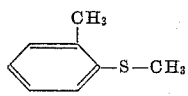

A solution of 1316 g. of methyl o-tolyl sulfide in 4 liters of carbon disulfide is stirred as 2533 g. of anhydrous aluminum chloride is added thereto. 971 g. of acetic anhydride is added slowly so as to maintain the reaction medium boiling. The mixture is refluxed for a total period of three hours. At the end of this time the resulting mixture is poured upon 15 liters of ice and water containing 600 cc. of concentrated hydrochloric acid. The carbon disulfide layer is separated and the aqueous solution extracted with chloroform. The extract containing the product is dried and distilled under reduced pressure. The major product of this reaction is 3-methyl-4-methylmercaptoacetophenone, whose structural formula is:

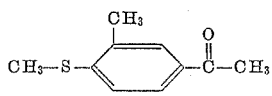

A solution of 1260 g. of 3-methyl-4-methylmercaptoacetophenone in 2600 cc. of acetic acid is heated to reflux and 2900 g. of 30% hydrogen peroxide is added at such a rate that the solution refluxes without external heating. At the end of the addition, heat is applied to the reaction system so as to maintain boiling. The total reaction period is three and one-half hours. The hot solution is diluted with 2 liters of water and cooled to a temperature of 10° C. The product which separates is 3-methyl-4-methylsulfonylacetophenone. It is collected and washed well with water. It has the following structural formula:

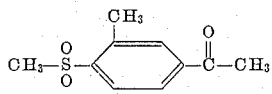

A mixture of 1035 g. of 3-methyl-4-methylsulfonylacetophenone with one liter of glacial acetic acid is stirred at room temperature as 780 g. of bromine is added. An initial induction period of from one to three hours is required after the first few grams of bromine are added before the reaction starts. The bromine is then added at such a rate that the reaction mixture is kept at a temperature of from 15 to 30° C. and is complete in about three hours. The resulting product is isolated by cooling the acetic acid and diluting with water. It consists essentially of alpha-bromo-3-methyl-4-methylsulfonylacetophenone and has the following structural formula:

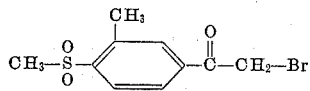

This compound is effective in controlling bean rust (*Uromyces appendiculatus*) when applied to bean plants at a concentration of 0.2%.

EXAMPLE 16

*Alpha,alpha - dibromo - 3 - methyl - 4 - methylsulfonylacetophenone*

Twenty-nine and one-tenth grams of alpha-bromo-3-methyl-4-methylsulfonylacetophenone are dissolved in glacial acetic acid between 70 and 95° C. Sixteen grams of bromine are added dropwise with good stirring. When the addition is completed, heating is continued for 10 or 15 minutes. Then the reaction mixture is cooled to room temperature and poured into one liter of cold water. The dibromo compound comes out of solution, is collected, and purified. The chemical structure of alpha,alpha - dibromo - 3 - methyl - 4 - methylsulfonylacetophenone is

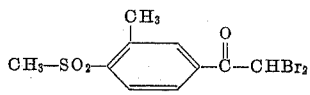

This compound is useful in controlling bean rust (*Uromyces appendiculatus*) when applied to bean plants at a concentration of 0.2%.

EXAMPLE 17

*Alpha-bromo-5-chloro-2-methylsulfonylacetophenone*

A solution of 500 g. of p-chlorophenyl methyl sulfide in 1800 cc. of carbon disulfide is stirred as 838 g. of aluminum chloride is added to it. Three hundred and twenty-one grams of acetic anhydride is added at a rate such that the reaction mixture is maintained in a state of reflux. At the end of four hours of refluxing, the mixture is poured upon 7 liters of ice and water containing 300 cc. of concentrated hydrochloric acid. The carbon disulfide layer is separated and the aqueous solution extracted with chloroform. The product contained in the CS₂ layer and chloroform extract is distilled at about 1 mm. pressure. The main fraction of the product is 5-chloro-2-methylmercaptoacetophenone and has the following structural formula:

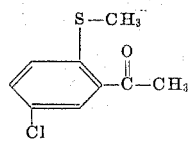

A solution of 195 g. of 5-chloro-2-methylmercaptoacetophenone in 400 cc. of glacial acetic acid is heated to reflux. 450 g. of hydrogen peroxide is then added at such a rate that refluxing occurs without further application of heat. Towards the end of the reaction, it is necessary to apply heat to maintain the solution at reflux. At the end of a total reflux period of two hours, the solution is cooled and diluted with water whereupon the product separates. The product, 5-chloro-2-methylsulfonylacetophenone, is collected and may be crystallized from alcohol if desired. It has the following formula:

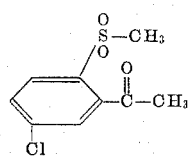

To a stirred suspension of 195 g. of 5-chloro-2-methylsulfonylacetophenone in 400 cc. of glacial acetic acid at room temperature there is added 134 g. of bromine. After an initial induction period, the solution rapidly decolorizes the bromine. The rate of addition of bromine is controlled so that the temperature of the reaction mixture does not exceed 30° C. At the end of the reaction, the desired product, alpha-bromo-5-chloro-2-methylsulfonylacetophenone, is obtained by diluting the acetic acid with water. It has the following formula:

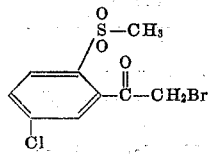

This compound is effective in controlling early blight when applied to tomato foliage.

EXAMPLE 18

*Alpha,alpha - dibromo - 5 - chloro - 2 - methylsulfonylacetophenone*

A 31.1 gram portion of alpha-bromo-5-chloro-2-methylsulfonylacetophenone prepared as in Example 7 is reacted with 16 grams of bromine in glacial acetic acid in the manner described in Example 16 to produce a compound of the formula

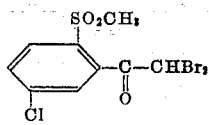

This compound is also effective in controlling early blight when applied to tomato foliage.

EXAMPLE 19

*Alpha - bromo - 5 - isopropylsulfonyl - 2 - methoxyacetophenone*

A solution of 504.2 g. of anhydrous sodium sulfite in 2 liters of water containing 80 g. of sodium hydroxide is stirred rapidly as 413.3 g. of p-methoxybenzenesulfonyl chloride is added. The temperature of the reaction mixture is kept below 50° C. Ten per cent sodium hydroxide is used to keep the solution basic. The product, sodium p-methoxybenzenesulfinate, which crystallizes after the solution is concentrated and cooled. It has the following structure:

A suspension of 300 g. of sodium p-methoxybenzenesulfinate suspended in one liter of absolute ethanol containing 262 g. of isopropyl iodide is refluxed for a period of ten hours. The resulting solution is diluted with 5 liters of water and the crude product separates. The product, p-isopropylsulfonylanisole, is purified by extraction with chloroform and distillation under reduced pressure. It has the following structural formula:

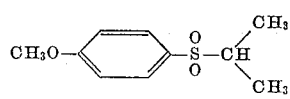

A solution of 265 g. of p-isopropylsulfonylanisole and 126.5 g. of acetic anhydride in 1240 cc. of tetrachloroethane and 300 cc. of nitrobenzene is stirred and cooled to a temperature of from zero to 5° C. One hundred and sixty-five grams of anhydrous aluminum chloride are gradually added to the cooled solution. The reaction mixture is kept at a temperature of from 0–5° C. for a period of three days and then poured upon 5 liters of ice and water containing 300 cc. of concentrated hydrochloric acid. The organic layer is separated, collected and steam distilled to remove the tetrachloroethane and nitrobenzene. The product which separates from the water on cooling is 5-isopropylsulfonyl-2-methoxyacetophenone. Its structural formula is shown below:

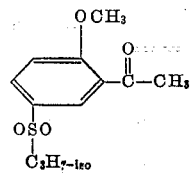

A mixture consisting of 107 g. of 5-isopropylsulfonyl-2-methoxyacetophenone in 500 cc. of glacial acetic acid is stirred at normal room temperature. 66.6 g. of bromine is added to the mixture. Following an initial induction period, the bromine is taken up rapidly and at the end of two hours the resulting solution is diluted with water and filtered. The solid which is collected on the filter paper is washed thoroughly with water and dried. The product, alpha-bromo-5-isopropylsulfonyl-2-methoxyacetophenone, may be recrystallized from glacial acetic acid. The structural formula of this substituted acetophenone is:

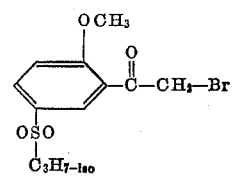

This compound is useful in controlling bean rust (*Uromyces appendiculatus*) when applied to bean plants at a concentration of 0.2%.

EXAMPLE 20

*Alpha, alpha-dibromo - 5 - isopropylsulfonyl-2-methoxyacetophenone*

A 33.5 gram portion of alpha-bromo-5-isopropylsulfonyl-2-methoxyacetophenone prepared as in Example 19 is reacted with 16 grams of bromine in glacial acetic acid in the manner set forth in Example 16. The resulting alpha, alpha-dibromo-5-isopropylsulfonyl - 2 - methoxyacetophenone can be represented by the following formula:

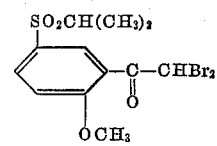

This dibromo compound is useful in controlling bean rust (*Uromyces appendiculatus*) when applied to bean plants at a concentration of 0.2%.

EXAMPLE 21

*Alpha-bromo-p-chloromethylsulfonylacetophenone*

Twenty-three and three-tenths grams of p-chloromethylsulfonylacetophenone prepared in the manner fully described in my copending application Serial No. 418,227, filed March 23, 1954, are dissolved in 70 ml. of glacial acetic acid at 40° C. A mixture of 16 grams of bromine and 10 ml. of glacial acetic acid are added dropwise with stirring. When one-third of the bromine has been added, the brominated acetophenone starts to crystallize out. The temperature of the reaction mixture is raised to about 75° and the remainder of the bromine is added to the clear solution. When the addition of bromine is completed, the reaction mixture is cooled down to room temperature with stirring and then filtered. The solid product is collected, washed with glacial acetic acid, then with water and dried to yield 17.8 grams of product, M. P. 132–137°. Recrystallization from absolute ethanol raised the melting point of the alpha-bromo-p-chloromethylsulfonylacetophenone to 138–140°.

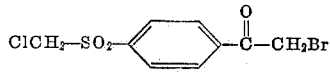

Calculated for C₉H₈O₃SClBr: C, 34.69; H, 2.59; S, 10.29. Found: C, 34.89; H, 2.81; S, 10.34.

The compound is useful in controlling early blight (*Alternaria solani*) on tomato foliage.

EXAMPLE 22

*Alpha, alpha - dibromo - p-chloromethylsulfonylacetophenone*

Thirty-one and two-tenths grams of alpha-bromo-p-chloromethylsulfonylacetophenone prepared as in Example 21 are reacted with 16 grams of bromine in glacial acetic acid as in the manner described in Experiment 16. The resulting product has the formula:

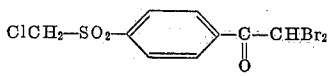

The compound is useful as a fungicide, particularly in controlling early blight (*Alternaria solani*) of tomatoes.

EXAMPLE 23

*Alpha-bromo-p-trifluoromethylsulfonylacetophenone*

Chlorine gas is passed into a solution of 228 parts of p-ethylphenyl methyl sulfide in 2880 parts of carbon tetrachloride until 340 parts is taken up. The temperature of the carbon tetrachloride solution is maintained at 25–35° C. during the chlorination. After the addition of chlorine is complete, the solution is stirred for a period of about one hour at normal room temperature. The temperature of the solution is raised to 70° C. and the solution is stirred for an additional period of 30 minutes. The solvent is removed from the system at reduced pressure and the material remaining is crude p-ethylphenyl trichloromethyl sulfide.

A mixture of 383 parts of crude p-ethylphenyl trichloromethyl sulfide and 99 parts of anhydrous hydrogen fluoride is heated to a temperature of 100° C. in a closed metal rocker bomb for a period of two hours. The bomb and its contents are allowed to cool. The bomb is opened. The reaction mixture is mixed with 670 parts of methylene chloride. The resulting solution is washed twice with water and the solvent removed. The residue is fractionated at reduced pressure to give p-ethylphenyl trifluoromethyl sulfide, B. P. 91–92°/30 mm., $n_D^{20}$ 1.4733. The formula of this product is as follows:

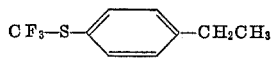

Analysis calculated for C₉H₉F₃S: C, 52.41; H, 4.4; F, 27.64. Found: C, 52.82; H, 4.66; F, 28.0.

To a stirred mixture of 206 parts of p-ethylphenyl trifluoromethyl sulfide and 157.5 parts of acetic acid there is added 392 parts of 40% peracetic acid. Throughout the addition of the peracetic acid the temperature of the sulfide-acid mix is maintained at about 80° C. The reaction mixture is stirred at a temperature of from 80–90° C. for one hour after completion of the peracetic acid addition. The reaction mixture is cooled to room temperature. 200 parts of water is added thereto. Solid sodium sulfite is then added to the aqueous solution until the reaction mixture does not liberate iodine from a solution of sodium iodide in acetic anhydride.

The product which consists essentially of p-ethylphenyl trifluoromethyl sulfone is extracted with hexane. The hexane solution is extracted with aqueous alkali to remove acetic acid. The hexane is then removed and the product is fractionated under reduced pressure and found to have the following properties: B. P. 129–131° at 18 mm., $n_D^{20}$ 1.4726. Ethylphenyl trifluoromethyl sulfone can be represented by the following formula:

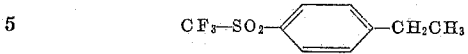

Analysis calculated for C₉H₉F₃SO₂: C, 45.37; H, 3.81; F, 23.93. Found: C, 45.90; H, 4.03; F, 25.3.

To a solution containing 123 parts of magnesium nitrate hexahydrate in 600 parts of water there is added 85.8 parts of p-ethylphenyl trifluoromethyl sulfone in 600 parts of acetone. The resulting mixture is stirred while 76 parts of potassium permanganate are added over a period of three hours. The temperature of the mixture is maintained at 50–55° throughout the KMnO₄ addition. After the system is stirred for an hour, the excess permanganate is reacted with sodium sulfite. The product is extracted from the reaction mixture with chloroform. After evaporation of the chloroform, the mixture is fractionated under reduced pressure. The distillate comprised p-ethylphenyl trifluoromethyl sulfone, the starting material. The pot residue, crude p-acetylphenyl trifluoromethyl sulfone, crystallizes on cooling, M. P. 45–44° C. It is crystallized from hexane to give material melting at 56–57° C. This sulfone has the formula

Analysis calculated for C₉H₇O₃SF₃: C, 42.86; H, 2.80; F, 22.60. Found: C, 42.99; H, 3.08; F, 23.3.

Sixteen and one-half parts of bromine are added over a period of 30 minutes to a solution containing 25.2 parts of p-acetylphenyl trifluoromethyl sulfone in 105 parts of acetic acid. The reaction mixture is stirred for an hour and then poured into 500 parts of an ice-water mixture. This mixture is stirred for 15 minutes. The crude alpha-bromo-p-trifluoromethylsulfonylacetophenone crystallizes and is filtered off, washed with water, and dried, M. P. 49–51° C. It can be represented by the following formula:

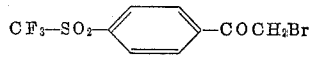

This compound is useful in controlling bean rust (*Uromyces appendiculatus*) when applied to bean plants at a concentration of 0.2%.

Example 24

*Alpha, alpha-dibromo-p-trifluoromethylsulfonylacetophenone*

This compound is prepared in accordance with procedure described in Example 16 by reacting 0.1 mole of the alpha-bromo-p-trifluoromethylsulfonylacetophenone of Example 23 with 0.1 mole of bromine in glacial acetic acid. This compound, whose formula is shown below, is useful in controlling bean rust (*Uromyces appendiculatus*) when applied to bean plants at a concentration of 0.2%.

The following compounds are further examples of my novel mono- and di- haloalkylsulfonylacetophenones. They can be prepared in accordance with procedures fully described above.

Alpha-iodo-p-ethylsulfonylacetophenone
Alpha-chloro-p-dodecylsulfonylacetophenone
Alpha-iodo-p-cyclopentylsulfonylacetophenone
Alpha-chloro-p-cyclopentylsulfonylacetophenone
Alpha-chloro-o-methylsulfonylacetophenone
Alpha-chloro-m-methylsulfonylacetophenone
Alpha-bromo-3-methyl-4-methylsulfonylacetophenone Alpha-chloro-5-chloro-2-propylsulfonylacetophenone
Alpha - bromo - 5 - isopropylsulfonyl - 2 - ethoxyacetophenone
Alpha-iodo-p-chloromethylsulfonylacetophenone
Alpha-chloro-p-dichloromethylsulfonylacetophenone
Alpha-bromo-p-bromomethylsulfonylacetophenone
Alpha-chloro-p-fluoromethylsulfonylacetophenone
Alpha-bromo-p-trichloromethylsulfonylacetophenone
Alpha-chloro-p-trifluoromethylsulfonylacetophenone
Alpha-bromo-(p-vinylsulfonyl)acetophenone
Alpha-iodo-2-ethoxy-4-methylsulfonylacetophenone
Alpha-chloro-3-propoxy-5-ethylsulfonylacetophenone
Alpha - iodo - 5 - isopropoxy - 2 - isopropylsulfonylacetophenone
Alpha-iodo-2-bromo-4-hexylsulfonylacetophenone
Alpha,alpha-diiodo-p-methylsulfonylacetophenone
Alpha,alpha-dichloro-o-n-propylsulfonylacetophenone
Alpha - chloro - alpha - bromo - p - methylsulfonylacetophenone
Alpha,alpha - dichloro - 3 - ethyl - 4 - methylsulfonylacetophenone
Alpha,alpha-dichloro-p-isoamylsulfonylacetophenone
Alpha,alpha - dichloro - 5 - chloro - 2 - ethylsulfonylacetophenone
Alpha,alpha - diiodo - 5 - isobutylsulfonyl - 2 - propoxyacetophenone
Alpha,alpha - diiodo - p - bromomethylsulfonylacetophenone
Alpha,alpha - dichloro - p - trichloromethylsulfonylacetophenone
Alpha,alpha - diiodo - p - tribromoethylsulfonylacetophenone Of the above-described compounds of my invention, the preferred ones are those wherein the aliphatic group is lower alkyl and the sulfonyl group is attached to the para position of the phenyl nucleus. The monobromo and dibromo compounds are particularly preferred.

I claim:
1. A compound of the formula

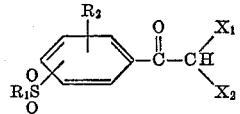

where $R_1$ is an aliphatic radical containing up to 12 carbon atoms of the class consisting of unsubstituted and halogen substituted aliphatic groups, $R_2$ is selected from the group consisting of hydrogen, halogen, lower alkyl and lower alkoxy radicals, $X_1$ is a halogen of the class consisting of chlorine, bromine and iodine, and $X_2$ is a member of the class consisting of hydrogen, chlorine, bromine and iodine.

2. A compound of the formula

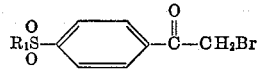

where $R_1$ is a lower alkyl group.

3. A compound of the formula

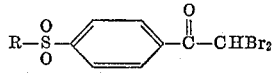

where R represents a lower alkyl group.

4. Alpha-bromo-p-methylsulfonylacetophenone.
5. Alpha,alpha - dibromo - p - methylsulfonylacetophenone.
6. Alpha-bromo-p-ethylsulfonylacetophenone.
7. Alpha,alpha - dibromo - p - isopropylsulfonylacetophenone.
8. Alpha-bromo-p-isopropylsulfonylacetophenone.

No references cited.